United States Patent [19]
Yoshizawa

[11] Patent Number: 5,604,666
[45] Date of Patent: Feb. 18, 1997

[54] OUTDOOR COMMUNICATION DEVICE HAVING DISK-LIKE MOUNTING PORTION, UNITS STACKED ON THE MOUNTING PORTION, AND FIXING MEMBERS FOR FIXING THE UNITS ON THE MOUNTING PORTION

[75] Inventor: Kazuhisa Yoshizawa, Tokyo, Japan

[73] Assignee: NEC Corporation, Tokyo, Japan

[21] Appl. No.: 426,117

[22] Filed: Apr. 20, 1995

[30] Foreign Application Priority Data

Apr. 20, 1994 [JP] Japan ................................. 6-104393

[51] Int. Cl.$^6$ ............................ H05K 7/02; H05K 5/00
[52] U.S. Cl. ........................ 361/735; 361/744; 361/729; 361/730; 361/733
[58] Field of Search .................... 174/52.1, 52.4; 257/686, 678, 777; 361/735, 744, 791, 729, 730, 733; 439/68, 66, 91, 83; 437/209, 915

[56] References Cited

U.S. PATENT DOCUMENTS 4,734,825  3/1988  Peterson ................................. 361/735
4,833,568  5/1989  Berhold .................................. 361/735
4,935,005  8/1990  Carlson et al. ......................... 257/686

FOREIGN PATENT DOCUMENTS 62-201996  12/1987  Japan.
0680930    3/1950   United Kingdom.
2161326    7/1985   United Kingdom.

*Primary Examiner*—Donald Sparks
*Attorney, Agent, or Firm*—Foley & Lardner

[57] ABSTRACT

The structure of an outdoor communication device includes a device body and a mounting base. The device body includes a device body, a disk-like mounting portion, a plurality of units, and a cylindrical cover. The units are enclosed in rectangular parallelepiped cases and are stacked and mounted on the mounting portion and serve to separately store electrical circuits for driving the device. The cylindrical cover has an opening portion on one end face side and serves to store the stacked units. The opening portion is fixed to the mounting portion. The mounting portion is detachably mounted on the mounting base such that the device body is suspended from and fixed to the mounting base with the mounting base being located above the device body. Fixing members are used to fix the units while the units are stacked on the mounting portion, such that the units are stacked substantially in a form of a cross.

7 Claims, 3 Drawing Sheets

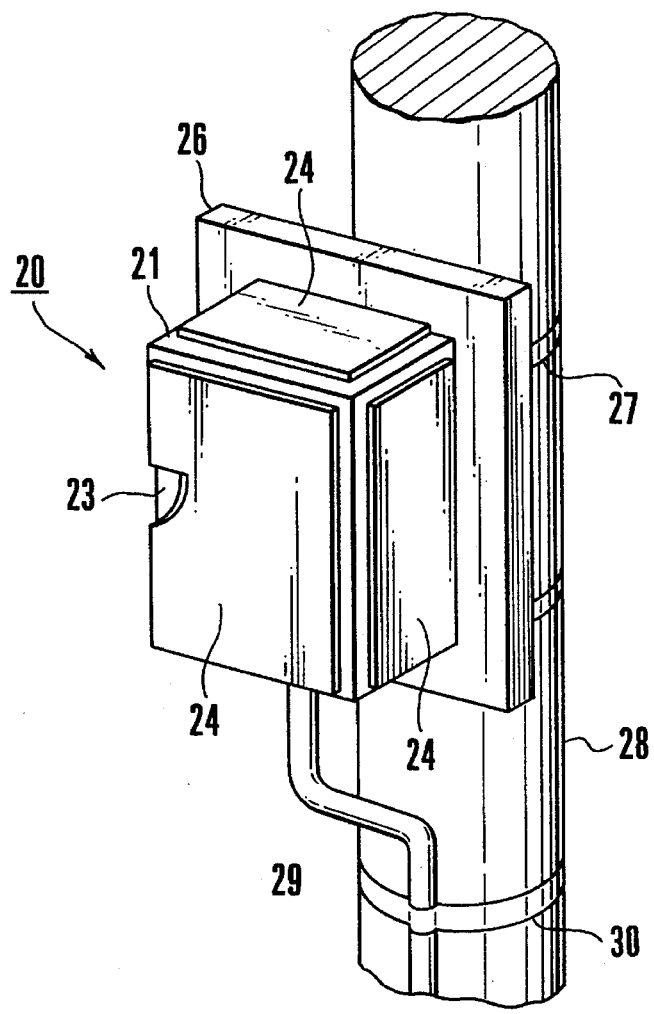
FIG. 5
PRIOR ART
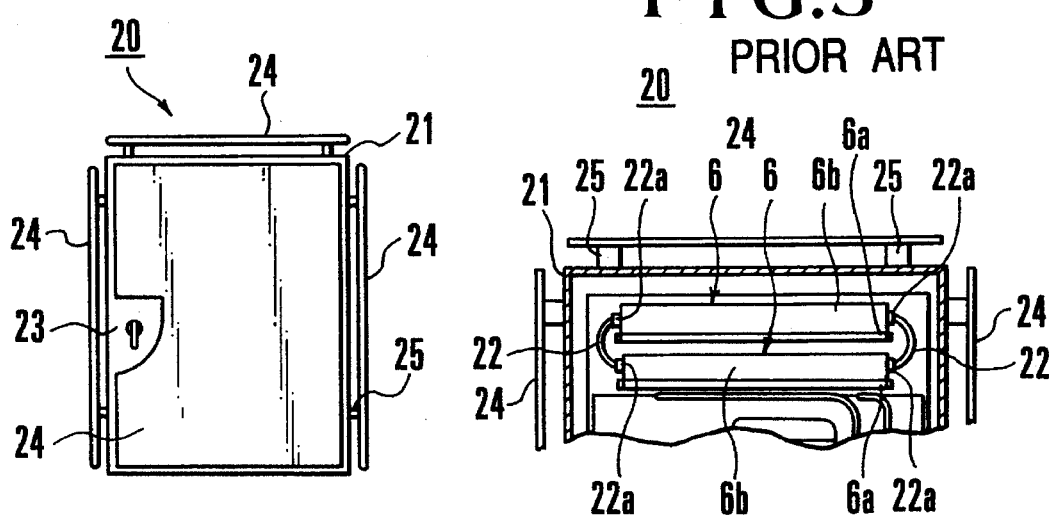
FIG. 6A
PRIOR ART
FIG. 6B
PRIOR ART

1

OUTDOOR COMMUNICATION DEVICE HAVING DISK-LIKE MOUNTING PORTION, UNITS STACKED ON THE MOUNTING PORTION, AND FIXING MEMBERS FOR FIXING THE UNITS ON THE MOUNTING PORTION

BACKGROUND OF THE INVENTION

The present invention relates to the structure of an outdoor communication device such as the base station device of a radio communication equipment.

As shown in FIG. 6A, a conventional outdoor communication device of this type comprises a rectangular parallelepiped casing 21, a cover 23 for covering an opening portion of the casing 21, and light-shielding plates 24 respectively mounted on the front surface, two side surfaces, and top surface of the casing 21 via fixing members 25 to cover almost all the surfaces (Japanese Utility Model Laid-Open No. 62-201996). As shown in FIG. 6B, a plurality of units 6 are stacked/mounted in the casing 21 at predetermined intervals. The units 6 respectively comprise storing cases 6b for separately storing electrical circuits including circuit parts, and printed circuit boards 6a on which the electrical circuits in the storing cases 6b are mounted. Reference numerals 22 denote cables for connecting the respective units 6 via connectors 22a.

In the above structure, the casing 21, the cover 23, and the light-shielding plate 24 are respectively made of thin metal sheets or the like. The cover 23 is fixed to the casing 21 via a hinge so that the opening portion can be freely opened/closed. Fixing members 25 are fixed to the casing 21 and the cover 23 by spot welding. As shown in FIG. 5, a communication device 20 is mounted on a mounting base 26 fixed to a telephone pole 28 with fixing members 27. A wiring bundle 29 is fixed to the telephone pole 28 with a fixing member 30 to extend along the longitudinal direction of the telephone pole 28.

According to the structure of the above conventional outdoor communication device, however, a large number of parts are required: the cover 23 for covering the opening portion of the casing 21, the four light-shielding plates 24, the fixing members 25 for fixing the light-shielding plates 24, the hinge for allowing the cover 23 to be freely opened/closed, the cables 22 for connecting the respective units to each other, and the like. In addition, a large number of manufacturing steps are required. Consequently, the device is high in cost. Consider the problem of wind resistance, as well, which cannot be avoided because the device is designed for outdoor use. Since the casing has a rectangular parallelepiped shape, wind pressure will act on a large area of the casing. For this reason, the mounting base 26, the light-shielding plates 24, and the fixing members 25 must be high in strength. This also leads to an increase in cost. Furthermore, the units 6 are fixed in accordance with the rectangular parallelepiped shape of the casing 21. Owing to this fixing method, the mounting efficiency deteriorates. With a tendency to give priority to the function and increase in thickness and length, a communication device tends to lose harmony with the environment in which the device is installed, thus spoiling the appearance of the surroundings.

SUMMARY OF THE INVENTION

It is an object of the present invention to provide the structure of an outdoor communication device which can decrease the number of parts and the number of manufacturing steps to realize a reduction in cost and facilitate maintenance.

It is another object of the present invention to provide the structure of an outdoor communication device which can improve the mounting efficiency for electrical circuit units, and has excellent wind resistance.

In order to achieve the above objects, according to the present invention, there is provided a structure of an outdoor communication device comprising a device body including a disk-like mounting portion, a plurality of units, stacked and mounted on the mounting portion, for separately storing electrical circuits for driving the device in rectangular parallelepiped cases, and a cylindrical cover, having an opening portion on one end face side, for storing the stacked units, the opening portion being fixed to the mounting portion a mounting base on which the mounting portion is detachably mounted such that the device body is suspended from and fixed to the mounting base with the mounting portion being located above the device body, and fixing members for fixing the units while the units are stacked on the mounting portion, such that the units are stacked substantially in the form of a cross.

BRIEF DESCRIPTION OF THE DRAWINGS

FIG. 5 is a perspective view showing a mounted state of a conventional outdoor communication device; and FIG. 6A is a front view of the conventional outdoor communication device, and FIG. 6B is a partially cutaway front view showing the main portion of the internal structure of the device in FIG. 6A.

DESCRIPTION OF THE PREFERRED EMBODIMENT

Figure 1:
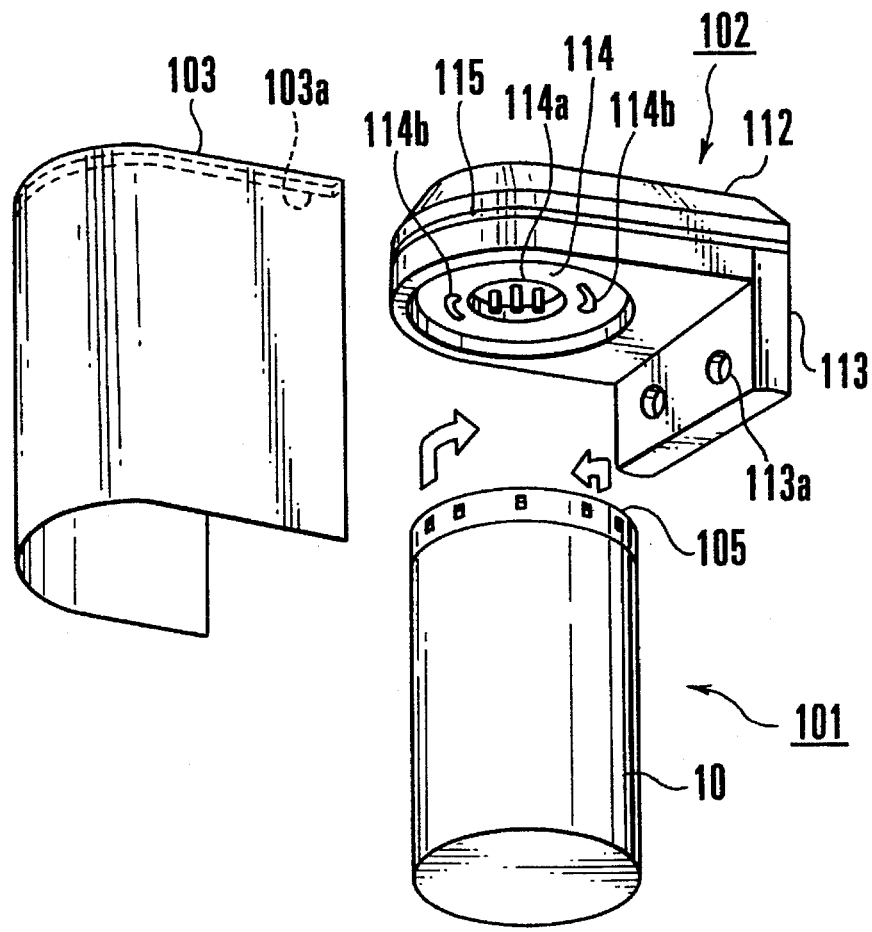
FIG. 1 is an exploded perspective view showing an outdoor communication device according to an embodiment of the present invention.
Figure 2:
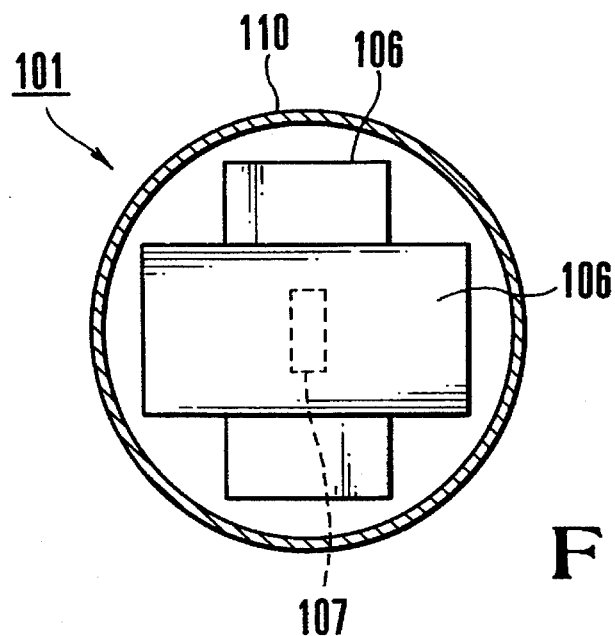
FIG. 2 is a longitudinal sectional view of the device body in FIG. 1.
Figures 3A, 3B:
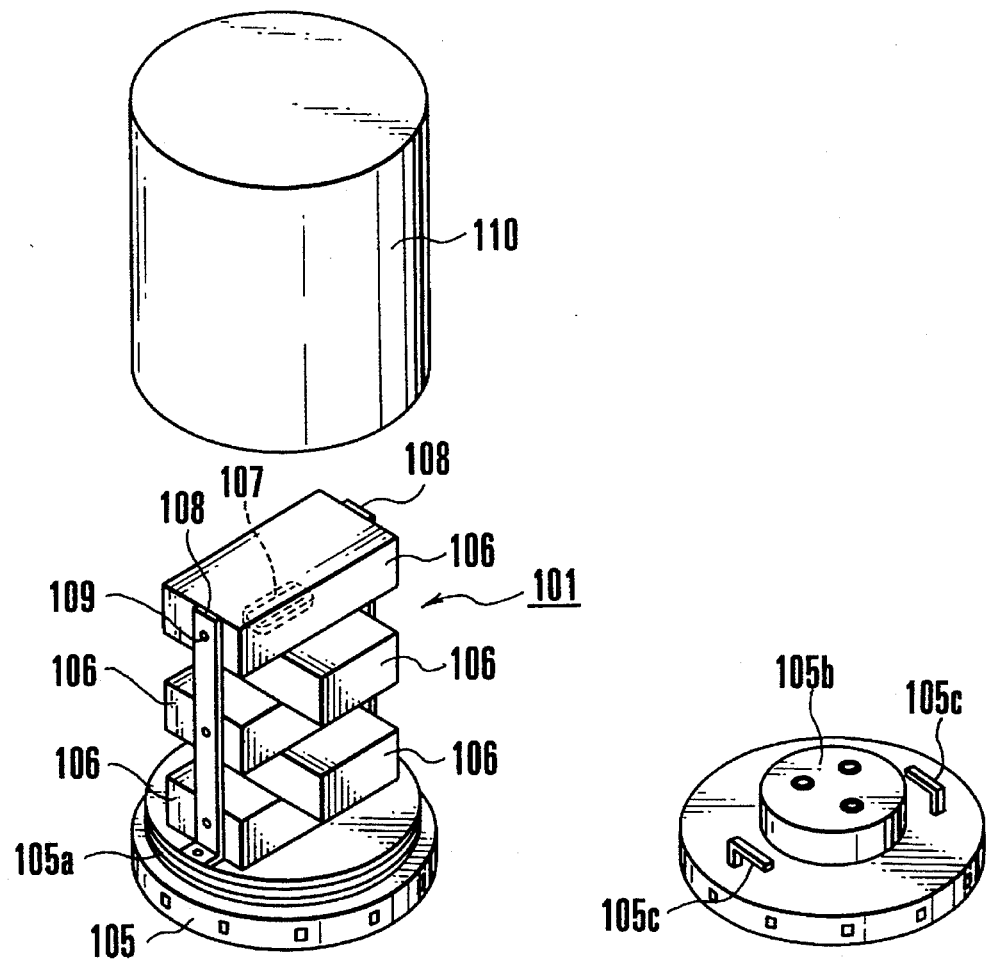
FIG. 3A is a perspective view showing a state wherein a cover is removed from the device body in FIG. 1.
FIG. 3B is a perspective view showing a mounting portion with the second surface facing up.
Figure 4:
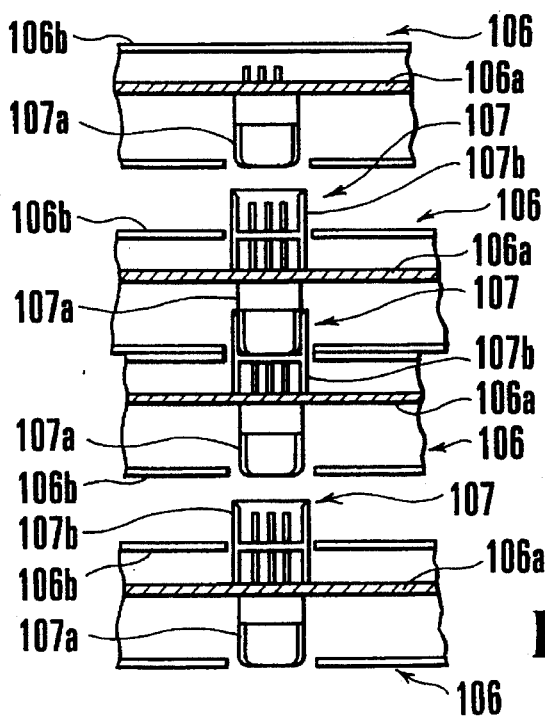
FIG. 4 is a longitudinal sectional view for explaining a connected state of stacked units.

An embodiment of the present invention will be described below with reference to the accompanying drawings. FIG. 1 shows an outdoor communication device according to the present invention. FIG. 2 shows the device body in FIG. 1. FIG. 3A shows a state wherein units are mounted in the outdoor communication device according to the present invention. FIG. 3B shows a mounting portion viewed from the connector side. FIG. 4 shows a connected state of stacked units. Referring to FIG. 1, the structure of the outdoor communication device according to the present invention comprises a cylindrical device body 101, a mounting base 102 for holding the upper end portion of the device body 101, and a light-shielding plate 103 having a curved surface for covering the outer surface of the device body 101.

As shown in FIG. 3A, the device body 101 comprises a thick, disk-like mounting portion 105 having a large-diameter threaded portion 105a formed on its peripheral edge, a plurality of units 106 alternately stacked and held on the first surface of the mounting portion 105 on which the threaded portion 105a is formed, and a cap-like cover 110 fitted on the units 106.

As shown in FIG. 3B, a cylindrical connector 105b of a plug-in system is arranged on the central portion of the second surface of the mounting portion 105, and a pair of hooks 105c are arranged around the connector 105b to oppose each other.

As shown in FIG. 4, each unit 106 is constituted by a printed circuit board 106a, a connector 107 of a plug-in system, and a storing case 106b. Electrical circuits including electrical parts constituting the device body 101 are separately mounted on the respective printed circuit boards 106a. Each connector 107 has a press fit connector 107a and a post housing 107b respectively fitted to the upper and lower surfaces of the printed circuit board 106a. With a combination of the press fit connector 107a and the post housing 107b, the connector 107 exchanges electrical signals. Each storing case 106b consists of a synthetic resin serves to store the printed circuit board 106a and the connector 107. The storing case 106a window portion formed at a position corresponding to the press fit connector 107a and the post housing 107b. The press fit connector 107a is plugged in the post housing 107b via this window portion.

As shown in FIG. 2, the units 106 are stacked on each other with the connectors 107 being connected to each other in such a manner that the vertically adjacent units 106 are arranged in the form of a cross when viewed from the above. Of the stacked units 106, the odd-numbered units 106 are fixed to the mounting portion 105 via fixing members 108 with screws 109. In this manner, the units 106 are held on the mounting portion 105.

The cover 110 is made of a synthetic resin as a whole to have a cylindrical shape. The cover 110 has an opening portion on one end face side. A threaded portion (not shown) is formed on the inner surface of this opening portion. The cover 110 is fitted on the mounting portion 105 to cover the stacked units 106, and the threaded portion 105a. In this manner, the cover 110 is mounted on the mounting portion 105.

As shown in FIG. 1, the mounting base 102 comprises a substantially L-shaped, thick holding potion 112, and a mounting portion 113 having mounting holes 113a formed therein to allow the mounting base 102 to be fixed to a telephone pole or the like. A recess fitting portion 114 is formed in the lower surface of the mounting base 102 to have an inner diameter slightly larger than the outer diameter of the mounting portion 105. A waterproof connector 114a in which the connector 105b of the mounting portion 105 is plugged is arranged on the central portion of the recess fitting portion 114. A pair of engaging grooves 114b are formed around the connector 114a to oppose each other. The pair of hooks 105c of the mounting portion 105 are engaged with the engaging grooves 114b. Each engaging groove 114b has a key hole formed in its end portion. An engaging groove 115 is formed around the holding portion 112 of the mounting base 102. A wiring extraction hole (not shown) for wiring for the connector 114a is formed into a hollow portion in the rear surface of the mounting portion 113.

The light-shielding plate 103 is mounted on the mounting base 102 by elastically fitting a collar 103a in the engaging groove 115. The light-shielding plate 103 is made of a synthetic resin to have a substantially U-shaped cross-section. The collar 103a is formed on the inner surface of the upper edge of the light-shielding plate 103.

The process of mounting the outdoor communication device having the above arrangement will be described next.

First of all, the plurality of units 106 alternately stacked on each other and electrically connected to each other via the connectors 107 are fixed on the first surface of the mounting portion 105 with the fixing members 108 and the screws 109. The cover 110 is fitted on the fixed units 106, and the threaded portion of the cover 110 is threadably engaged with the threaded portion 105a, thereby mounting the cover 110 on the mounting portion 105. Subsequently, the device body 101 having the cover 110 fitted thereon is placed upside down to place the mounting portion 105 at an upper position. The mounting portion 105 is fitted in the recess fitting portion 114 of the holding portion 112 to fit the connector 105b on the recess fitting portion 114. The mounting portion 105 is then pivoted through a predetermined angle. As the mounting portion 105 is pivoted, the connector 114a on which the connector 105b is fitted is also pivoted through the predetermined angle. As the mounting portion 105 is pivoted, the hooks 105c, of the mounting portion 105, which are fitted in the engaging grooves 114b are engaged with the key holes. As a result, the device body 101 is suspended from and mounted on the mounting base 102. Thereafter, the light-shielding plate 103 is mounted on the mounting base 102 by fitting the collar 103a in the engaging groove 115 of the holding portion 112 so as to cover a side surface portion of the device body 101. In this manner, in cooperation with the mounting base 102 covering the upper surface portion of the device body 101, the light-shielding plate 103 prevents the device body 101 from being directly irradiated with sun light.

In performing maintenance and inspection, this mounting process is reversed. More specifically, first of all, the collar 103a of the light-shielding plate 103 is removed from the engaging groove 115 of the mounting base 102. The device body 101 is then pivoted through a predetermined angle in a direction opposite to that described above. With this operation, the hooks 105c of the mounting portion 105 are disengaged from the key holes of the engaging grooves 114b. When the device body 101 is pulled downward, the connector 114a is disconnected from the connector 105b. The device body 101 is then removed from the mounting base 102. Thereafter, the removed mounting base 102 is placed upside down to locate the mounting portion 105 at a lower position, and the cover 110 is rotated, thereby disengaging the threaded portion of the mounting portion 105 from the threaded portion 105a. With this operation, the cover 110 is removed from the mounting portion 105. The screws 109 are unfastened to remove the fixing members 108, and the units 106 are sequentially pulled upward to disconnect the connectors 7. In this manner, the units 106 are removed one by one. With this process, maintenance and inspection can be performed with respect to the device body 101, including inspection on the respective units 106.

As has been described above, according to the structure of the outdoor communication device of the present invention, electrical circuits constituting the device are separately stored, as units, in the device, and the respective units are electrically connected to each other. The device body comprises a cylindrical cover having an opening portion having a threaded portion formed on one side, and a mounting portion, having a connector and a threaded portion threadably engaged with the threaded portion of the cover, for covering the opening portion. The respective units are stacked and fixed on the mounting portion such that the units are in contact with each other in the form of a cross when viewed from the above. With this structure, the mounting efficiency improves, and the overall device can be reduced in size. In addition, since the cover has a cylindrical shape, the influence of wind pressure can be minimized.

In addition, according to the present invention, since plug-in connectors are respectively arranged among the stacked units and between the mounting portion of the device body and the mounting base, mounting and removal are facilitated, leading to an improvement in maintainability.

Furthermore, according to the present invention, the structure further comprises a mounting base from/to which the mounting portion of the device body is detachably suspended/fixed, and a light-shielding plate which covers a side surface of the device body, has a substantially U-shaped cross-section, and is detachably mounted on the mounting base. The mounting base serves as a light-shielding plate for covering the top surface of the device body, and no special members are required to mount this light-shielding plate. Therefore, the overall device can be constituted by the minimum number of parts such as a cover, a mounting portion, a mounting base, and a light-shielding plate. Hence, the number of parts can be decreased, and the device can be provided at a low cost.

What is claimed is:

1. A structure of an outdoor communication device comprising:

a device body including,
   a disk-like mounting portion,
   a plurality of units, stacked and mounted on said disk-like mounting portion in rectangular parallelepiped cases, for separately storing electrical circuits for driving said device, and
   a cylindrical cover, having an opening portion on one end face side, for storing said stacked units, the opening portion being fixed to said disk-like mounting portion; and a mounting base on which said disk-like mounting portion is detachably mounted such that said device body is suspended from and fixed to said mounting base with said disk-like mounting portion being located above said device body; and fixing members for fixing said units while said units are stacked on said disk-like mounting portion, such that said vertically adjacent units are stacked substantially in a form of a cross.

2. A device according to claim 1, further comprising connector means, arranged to oppose upper and lower surfaces of each of said units, for electrically plug-in-connecting said vertically adjacent units when said units are stacked on each other.

3. A device according to claim 1, further comprising connector means for electrically plug-in-connecting said device body and said mounting base when said disk-like mounting portion is mounted on said mounting base, and wherein said disk-like mounting portion has a holding portion extending in a horizontal direction, and said connector means are arranged to oppose a non-mounting surface of said disk-like mounting portion and a lower surface of said holding portion.

4. A device according to claim 3, further comprising engaging means, arranged to oppose a non-mounting surface of said disk-like mounting portion and a lower surface of said mounting base, for engaging/fixing said disk-like mounting portion to said mounting base when said device body is pivoted through a predetermined angle while said device body is plug-in-connected to said mounting base via said connector means.

5. A device according to claim 1, further comprising a light-shielding plate, formed to have a substantially U-shaped cross-section and having an engaging member on an inner surface of an upper edge thereof, for covering a side surface of said device body, said light-shielding plate being detachably mounted on said mounting base via said engaging member.

6. A device according to claim 5, wherein said cover and said light-shielding plate are made of a synthetic resin.

7. A device according to claim 1, further comprising a first threaded portion formed on a peripheral edge of a mounting surface of said mounting base, and a second threaded portion formed on an inner surface of a peripheral edge of the opening portion of said cylindrical cover, said first and second threaded portions being threadably engaged with each other to mount said cylindrical cover on said mounting base.

* * * * *